Dec. 22, 1925.  1,566,652
H. CLEMENT
OPTICAL DIAGNOSTIC INSTRUMENT
Filed July 10, 1924
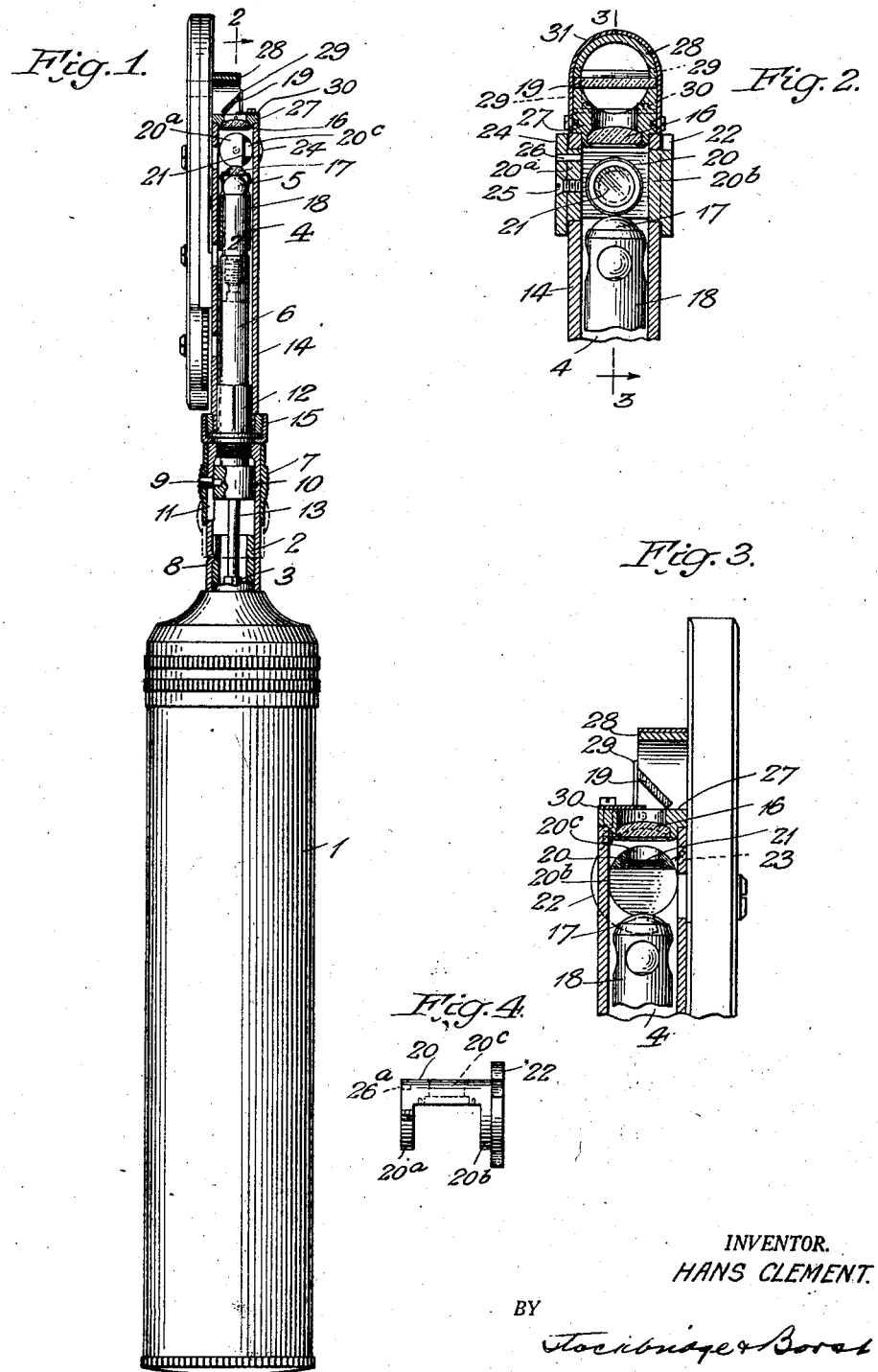
INVENTOR.
HANS CLEMENT.
BY
Stockbridge & Borst
ATTORNEYS Patented Dec. 22, 1925.

1,566,652

UNITED STATES PATENT OFFICE.

HANS CLEMENT, OF NEW YORK, N. Y., ASSIGNOR TO GENERAL OPTICAL COMPANY, INC., A CORPORATION OF NEW YORK.

OPTICAL DIAGNOSTIC INSTRUMENT.

Application filed July 10, 1924. Serial No. 725,266.

*To all whom it may concern:*

Be it known that I, HANS CLEMENT, a citizen of the United States, residing at New York city, in the county of New York and State of New York, have invented certain new and useful Improvements in Optical Diagnostic Instruments, of which the following is a full, clear, and exact description.

It is a well known fact in ophthalmoscopy that the color of the ocular fundus depends largely on the character of light used, the retina being transparent to red light but less so to blue or green light. The light rays of long wave length have great penetrating power, but the rays of short wave length, being but slightly penetrative, do not pass the retina, some being reflected and some absorbed and still others being altered by the retinal stroma. Consequently with ordinary light one sees only the choroid and retinal vessels, and these not always distinctly, especially in the macular region, while with light from which the red rays are excluded the retina becomes visible and the choroid relatively invisible, excepting in the case of pronounced blonds and albinos, when the choroid vessels may be seen.

The character of the light used therefore depends upon the nature of the examination to be made, and it is desirable with optical diagnostic instruments to provide means which will enable the oculist or optometrist to project either ordinary light or red free light into the patient's eye. Instruments having this capability have heretofore been known, but so far as I am aware such instruments have been objectionable in respect to their convertible feature, requiring as a rule a time-consuming operation involving an interchanging of parts to change from one light condition to the other.

It is an object of my invention to provide such an instrument which may be easily and quickly manipulated to insert or remove a red free filter without requiring any disassembling of the instrument, and which will be simple, compact and relatively inexpensive. An instrument made in accordance with my invention is entirely self-contained. My invention is well adaptable to instruments having focusing lamps in which the lamp is adjustable toward and from a condensing lens mounted in the end of a tube within which the lamp is contained. Within this tube, just back of the condensing lens if the instrument is of that type, I provide a ray filter holder which is operable from the outside of the tube and which will permit of the ready insertion or removal of a ray filter into or from the path of the light. In what I now consider my preferred form this holder is rotatively journaled in the two side walls of the tube and when manipulated presents either a red free filter or a cut-away portion to the light, thereby causing the instrument to project either red free rays or white light into the eye.

Another feature characteristic of my invention is the elimination of reflexes or halos across the sight aperture of such instruments. As these instruments have been heretofore constructed the portion of the mirror or other reflecting member adjacent the sight aperture has been within the path of the light rays. A common construction for instance has had a slit in the upper edge of the mirror for observation purpose through which the light is free to shine and on the edges of which the rays are more or less refracted. The light which thus strikes the walls of the observation passage above the mirror is to a greater or less degree reflected into the eye of the observer and impairs his vision of the area illuminated by the reflected spot of light.

In accordance with my invention I stop off all light which is not reflected by the mirror. Preferably the mirror is so arranged as to intercept substantially half the light passed through the condensing lens, the upper half toward the patient's eye being stopped off and the sight aperture being either through the stopped off portion of the mirror or the mirror may terminate in the plane of the inner edge of the stop and the sight aperture be over the upper edge of the mirror.

My invention has other objects and advantages and comprehends other features of construction as will hereinafter more fully appear. I shall now describe the illustrated embodiment of my invention and shall thereafter point out my invention in claims.

Fig. 1 is an elevation, partly in section, of an ophthalmoscope embodying my invention;

Fig. 2 is an enlarged sectional elevation of the upper portion thereof, taken on the line 2—2 of Fig. 1;

Fig. 3 is a view similar to Fig. 2 taken on the line 3—3 of Fig. 2; and

Fig. 4 is a detail of the ray filter holder.

The illustrated ophthalmoscope is, in the main, of usual or well known construction, having the battery containing handle 1, with electrical terminals 2 and 3. The base 4 for the miniature electric lamp 5 screws in the upper end of a socket 6 which makes contact with the terminals 2 and 3 and is adjustable up and down relative to the handle through the medium of an adjusting ring 7 which surrounds a sleeve 8 attached to the terminal 2, the ring 7 being connected to the socket 6 by a set screw 9 which screws into a boss 10 on the socket within the sleeve 8 and moves in a longitudinal slot 11 provided in the sleeve 8. A metallic contact sleeve 12 for the socket member 6 is attached, as by screw threads, to the upper end of the sleeve 8, and serves to guide the socket 6 in its movement as well as to complete its electrical connection with the positive terminal 2, the connection with the negative terminal 3 being made by an insulated axial contact rod 13 of the socket member 6.

An elongated tube 14, within which the lamp and its socket are contained and slide, is coupled to the outer end of the sleeve 8 by a union screw 15. This tube extends somewhat beyond the lamp, and in the construction shown, is an objective lens tube, there being a condensing or focusing lens 16 in the end of the tube. Also, in the form shown, there is provided a collecting lens 17 for the light rays, which collecting lens is mounted in the end of a sleeve 18 which fits over the lamp and the lamp base. This collecting lens serves to render the light rays parallel and to collect them on the condensing lens 16 which will bring them to a focus at a point depending upon the distance between the lamp and the condensing lens. A reflecting mirror 19 which is disposed over the condensing lens at an angle of 45 degrees will reflect the light rays in a line normal to the axis of the tube 14.

Journaled in the side walls of the tube 14, just behind the condensing lens 16 is the ray filter holder shown in detail in Fig. 4. This holder has a generally cylindrical body member 20 which is more than half cut out from one side, making the element approximately U-shaped in plan. The remaining end portions 20ª and 20ᵇ are therefore disc members which bear in holes provided for them in the respective side walls of the tube 14. The connecting portion of the holder 20, between the disc portions 20ª and 20ᵇ is provided with a radial passage 20ᶜ, the inner end of which is enlarged to provide a seat for the ray filter 21. This may be a red free gelatine filter contained between two clear cover glasses, and the filter may be held in place by turning the metal of the holder over the edge of its bottom surface, as indicated in Fig. 3.

Integral with the outer face of the disc portion 20ᵇ of the holder is an enlarged knurled thumb disc 22, which has a 90 degree circumferential cut-out in its periphery, as appears in Figs. 3 and 4. This cut-out bears against the outer face of the side wall of the tube 14 when the ray filter holder is in place and cooperates with a pin 23 on the side wall of the tube 14 to limit the rotative movement of the holder. Secured to the outer face of the disc portion 20ª, after the holder has been inserted in the tube, is another knurled thumb disc 24, which is secured to the end of the holder by an axial screw 25 and by an eccentric pin 26, which pin fits into a socket 26ª in the end of the holder and prevents relative rotation between the disc 24 and the holder.

It is now apparent that merely by manipulating the thumb discs 22 and 24, the ray filter holder may be turned on its axis 90 degrees so as to bring either the red free filter 21 or the cut-out portion of the holder in the path of the light. In Figs. 1 and 2, the holder is shown in such a position as to allow the clear light from the lamp to be reflected by the mirror 19, while in Fig. 3 the holder is shown in its position with the red free filter interposed in the light.

In the construction shown, the condensing lens 16 and the mirror 19 are contained within a single mount which is secured on the end of the tube 14. This mount is an angle member having a base 27 constituting the condensing lens mount, being provided with an axial passage in the lower end of which the condensing lens 16 is mounted, and an upright portion 28 of somewhat more than half the width of the base 27 and constituting the mirror mount, having an axial horizontal passage therethrough intersecting the passage in the base. The mirror 19 is mounted in inclined slots in the sides of the upright member 28, this mirror being so proportioned that its upper edge is flush with the outer or front face of the mirror mount 28. The mirror is prevented from escaping from its slots by two upstanding retaining fingers 29, which are integral with a diaphragm member 30 secured on the top of the condensing lens mount 27 by the same screws which attach this mount to the end of the tube 14. This diaphragm member 30 extends inwardly over the condensing lens 16 to within the vertical plane of the outer edge of the mirror 19, and serves to stop off all of the light which would not strike the mirror. In this way any light from the lamp 5 is prevented from reaching the observation passage through the member 28 above the mirror. If desired, the combined mirror and lens mount may be covered by a metallic hood 31.

It is obvious that various modifications may be made in the construction shown in the drawings and above particularly described within the principle and scope of my invention.

I claim:

1. An optical diagnostic instrument comprising a tube and a condensing lens mounted therein, a lamp in the tube, and a ray filter holder rotatively mounted in the tube between the lamp and condensing lens and adjustable between two positions in one of which a ray filter is interposed in the path of the light.

2. An optical diagnostic instrument comprising a tube and a condensing lens mounted therein, a lamp adjustably mounted in the tube, a collecting lens carried by and movable with the lamp, and a cylindrical ray filter holder rotatably mounted in the tube between the two lenses and having a ray filter in one transverse axis and being cut away in the other transverse axis.

3. An optical diagnostic instrument, comprising a tube having a light source therein, on obliquely disposed reflecting member on the end of the tube, and a ray filter holder mounted in the tube between the light source and reflecting member and rotatively adjustable between two positions and operative to insert and remove a ray filter into and from the path of the light.

4. An optical diagnostic instrument, comprising a tube having a light source therein, an obliquely disposed reflecting member on the end of the tube providing an observation opening above the line substantially coinciding with the transverse axial plane of the tube, and a diaphragm arranged to stop off the light rays which would not be reflected by the portion of the reflecting member below said line.

5. An optical diagnostic instrument, comprising a tube having a light source therein, an obliquely disposed reflecting member on the end of the tube extending partially over the tube opening, and a diaphragm covering the remainder of the tube opening and serving to stop off the light rays which would not be reflected.

6. An optical diagnostic instrument, comprising a tube having a light source therein, a holder for a reflecting member on the end of the tube, an oblique reflecting member in the holder so disposed as to extend partially over the tube opening and leave an observation opening over the reflecting member, and a diaphragm on the end of the tube stopping off the unreflected light.

7. An optical diagnostic instrument, comprising a tube having a light source therein, a holder on the end of the tube having an axial and a transverse passage therein, a condensing lens in the axial passage, an angularly arranged reflecting member in the transverse passage extending substantially over half of the tube opening and leaving an observation opening over the reflecting member, and a diaphragm over the other half of the tube opening.

8. An optical diagnostic instrument, comprising a tube having a light source therein, a holder on the end of the tube having an exial and a transverse passage therein, a condensing lens in the axial passage, an angularly arranged reflecting member in the transverse passage extending substantially over half of the tube opening and leaving an observation opening over the reflecting member, a diaphragm over the other half of the tube opening, and a substantially U-shape ray filter holder and filter therein rotatably mounted in the tube between the light source and condensing lens and adapted in one position to locate the ray filter across the axis of the tube and in another position to locate the ray filter behind the diaphragm.

In witness whereof, I hereunto subscribe my signature.

HANS CLEMENT.